Sept. 20, 1971 KATSUHIKO OKABE 3,606,346

AUTOMATIC TAPE CARTRIDGE PLAYER

Filed March 17, 1969 6 Sheets-Sheet 1

INVENTOR

KATSUHIKO OKABE

BY Holman, Glascock, Downing & Seebold

ATTORNEYS

Sept. 20, 1971 KATSUHIKO OKABE 3,606,346

AUTOMATIC TAPE CARTRIDGE PLAYER

Filed March 17, 1969 6 Sheets-Sheet 2

INVENTOR

KATSUHIKO OKABE

BY Holman, Glascock, Downing & Seebold

ATTORNEYS

INVENTOR
KATSUHIKO OKABE

BY Holman, Glascock, Downing & Seebold
ATTORNEYS

INVENTOR
KATSUHIKO OKABE

BY Holman, Glascock, Downing & Seebold
ATTORNEYS

INVENTOR

Katsuhiko Okabe

BY Holman, Glascock, Downing & Seebold

ATTORNEYS

INVENTOR
KATSUHIKO OKABE

BY Holman, Glascock, Downing & Seebold
ATTORNEYS

United States Patent Office 3,606,346
Patented Sept. 20, 1971

3,606,346
AUTOMATIC TAPE CARTRIDGE PLAYER
Katsuhiko Okabe, Tokorozawa, Japan, assignor to Victor Company of Japan Limited, Yokohama, Japan
Filed Mar. 17, 1969, Ser. No. 807,617
Claims priority, application Japan, Mar. 15, 1967 (utility model), 42/22,330; Apr. 12, 1967 (utility model), 42/31,269; Mar. 19, 1968, 43/17,524 (utility model), 43/21,108; Dec. 13, 1968, 43/90,997; Dec. 31, 1968 (utility model), 44/1,662
Int. Cl. G11b 5/00
U.S. Cl. 274—4F 4 Claims

ABSTRACT OF THE DISCLOSURE

An automatic tape cartridge player comprising a magnetic head for reproducing and playing a lowermost tape cartridge out of a plurality of tape cartridges loaded in layers in a casing, a cam-operated lever means for dropping and discharging or releasing said lowermost tape cartridge after termination of playing from its loaded position, and cam-operated lever means for supporting the loaded cartridges other than the discharged one during operation of the discharging means. One of said loaded cartridges immediately above the discharged one is then dropped to the lowermost position in the casing after operation of said discharge means.

The present invention relates to an automatic tape cartridge player, and more particularly to a device for automatically and consecutively playing a plurality of tape cartridges loaded in layers in a casing of a player.

The invention concerns a new and useful contrivance designed for automatic and successive playing of a plurality of tape cartridges in the same manner as in record autochangers for continuously playing a gramophone.

One object of the present invention is to provide an automatic tape cartridge player which is capable of playing consecutively and automatically a plurality of tape cartridges loaded in layers in a casing of a player.

Another object of the present invention is to provide an automatic tape cartridge player for automatically continuously playing which is designed for discharging downwardly a tape cartridge finished playing out of the player and positioning a subsequent cartridge to be played to a predetermined location.

Still another object of the present invention is to provide an automatic tape cartridge player having a change cycle mechanism which periodically pushes forth and back, separates and drops a tape cartridge by a cam mechanism.

A further object of the present invention is to provide an automatic tape cartridge player which operates a change cycle mechanism in cooperation with a sensing tape adhered to a magnetic tape and automatically and continuously carries out playing of a tape cartridge.

Still other objects and features of the invention will be apparent from the following description with reference to the accompanying drawings, in which.

Figure 1:
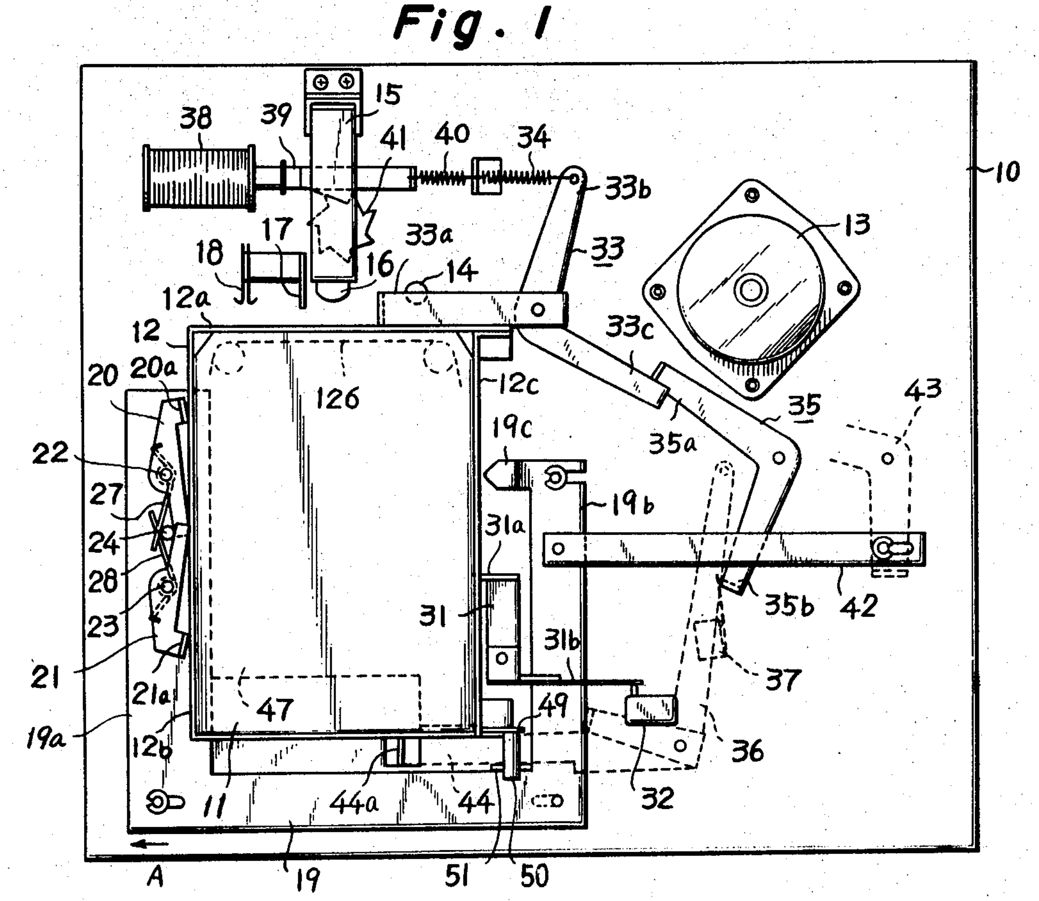
FIG. 1 is a plan view of an embodiment of this invention.
Figure 2:
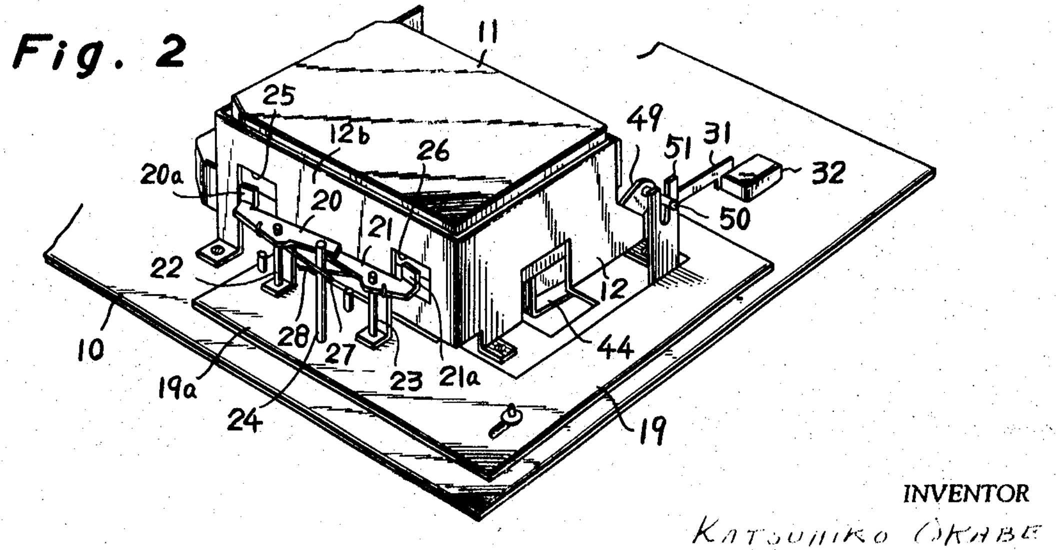
FIG. 2 and FIG. 3 are perspective views of the player according to the invention respectively viewed from the right and left sides.
Figure 3:
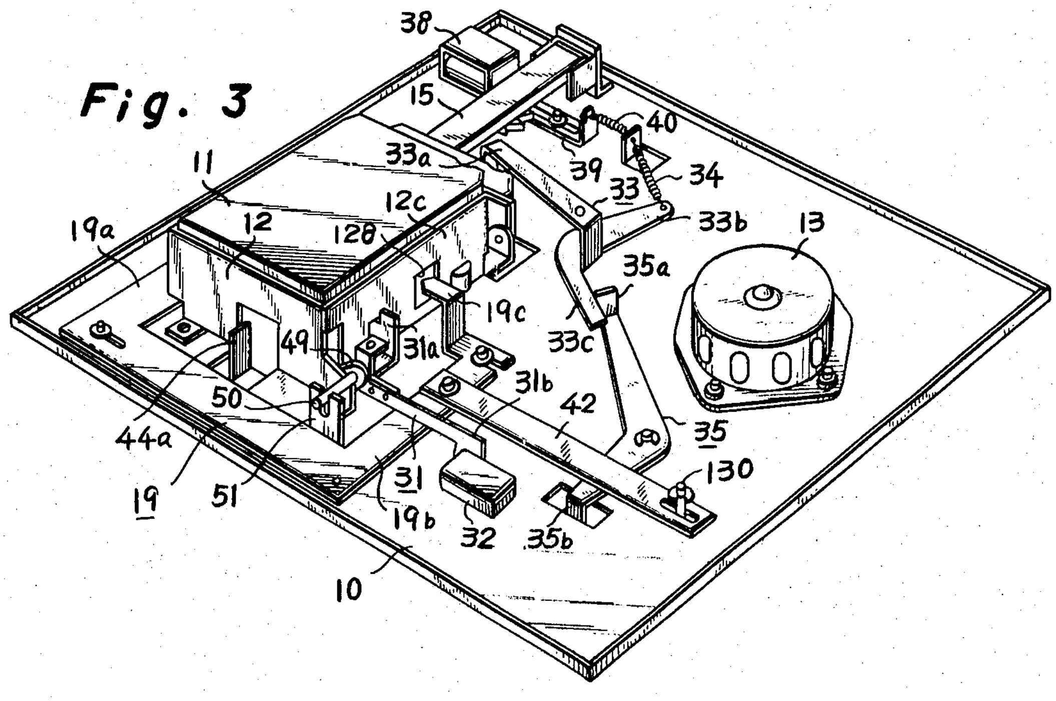

In FIG. 1 through FIG. 4, a chassis 10 is provided with a casing 12 for loading a plurality of tape cartridges 11 stacked in layers. A front plate 12*a* of the casing 12 has an opening through which is pushed outward a front part of a tape cartridge of the lowermost stage or layer. At a distance from said front plate 12*a* are provided a capstan 14 being transmitted a rotational force and driven by a motor 13 through a suitable non-illustrated belt, a magnetic head 16 held by a head holder 15, a tape guide 17 and a sensor 18 of detection contacts. A generally U-shaped slide lever 19 has opposed arms 19*a* and 19*b*. The forward end of the arm 19*b* has a bent portion 19*c*. Also, a pair of supporting levers 20, 21 are provided having respectively bent portions 20*a*, 21*a* and are pivotally rotated on respective shafts 22, 23 by the pushing of a pin 24 fixed on the arm 19*a*. The levers 20, 21 are urged to turn by springs 27, 28 so that the bent portions 20*a*, 21*a* may enter into the casing 12 through openings 25, 26 of the side plate 12*b*. The slide lever 19 is slidably moved by rotation of a rotary lever 30 which has a lever arm 30*a* engaging with a downwardly extending pin 29 secured to the lower surface of the slide lever 19. When a contact portion 31*a* of the forward end of a switch lever 31 is pushed by contacting with a side of the cartridge 11, the other end 31*b* of the lever 31 pushes a microswitch 32 for closing and energizing the power circuit. A rotary lever 33 has an arm 33*a* for pushing back a cartridge, a second arm 33*b* which is pulled by a spring 34 and a third arm 33*c* which engages with an end 35*a* of the rotary lever 35, which in turn engages with a lever 36 swingable by a cam means which will be later described. Thus the rotational force of the lever 36 is transmitted to the lever 33 by the lever 35. Further in rotation of the lever 35, by an end 35*b* of the lever 35 there is opened or closed a microswitch 37 which is connected in parallel with a sensor 18. A solenoid 38 moves a slidable plunger or rod 39 at each operation against the force of a spring 40 and intermittently urges rotatably a stepped cam 41 for changing over the height of the head 16 to thereby change tracks. There is further provided a lever 42 secured to the slide lever 19 so as to reset a lever 43 later described. A lever 44 is connected to a small lever 45 secured to the lever 36 by spring 46 and has an upstanding arm 44*a* for pushing the tape cartridge forward. The small lever 45 and spring 46 control the pushing strokes when the length of a tape cartridge is different. There is provided a bottom plate 47 for carrying the bottom surface of a tape cartridge in the lowermost stage or layer out of the cartridge stacked one upon another, such bottom plate being capable of rotating downwardly about a pair of pivots 48. Said bottom plate 47 has a crooked arm 49. A pin 50 fixed to the arm 49 engages with a vertical slot in projection 51 of the lever 19. The bottom plate 47 turns over about the pivots 48 by sliding of the lever 19.

Operations of the components of the above described structure of this invention will now be illustrated with reference to FIG. 5 through FIG. 16.

Figures 4, 16:
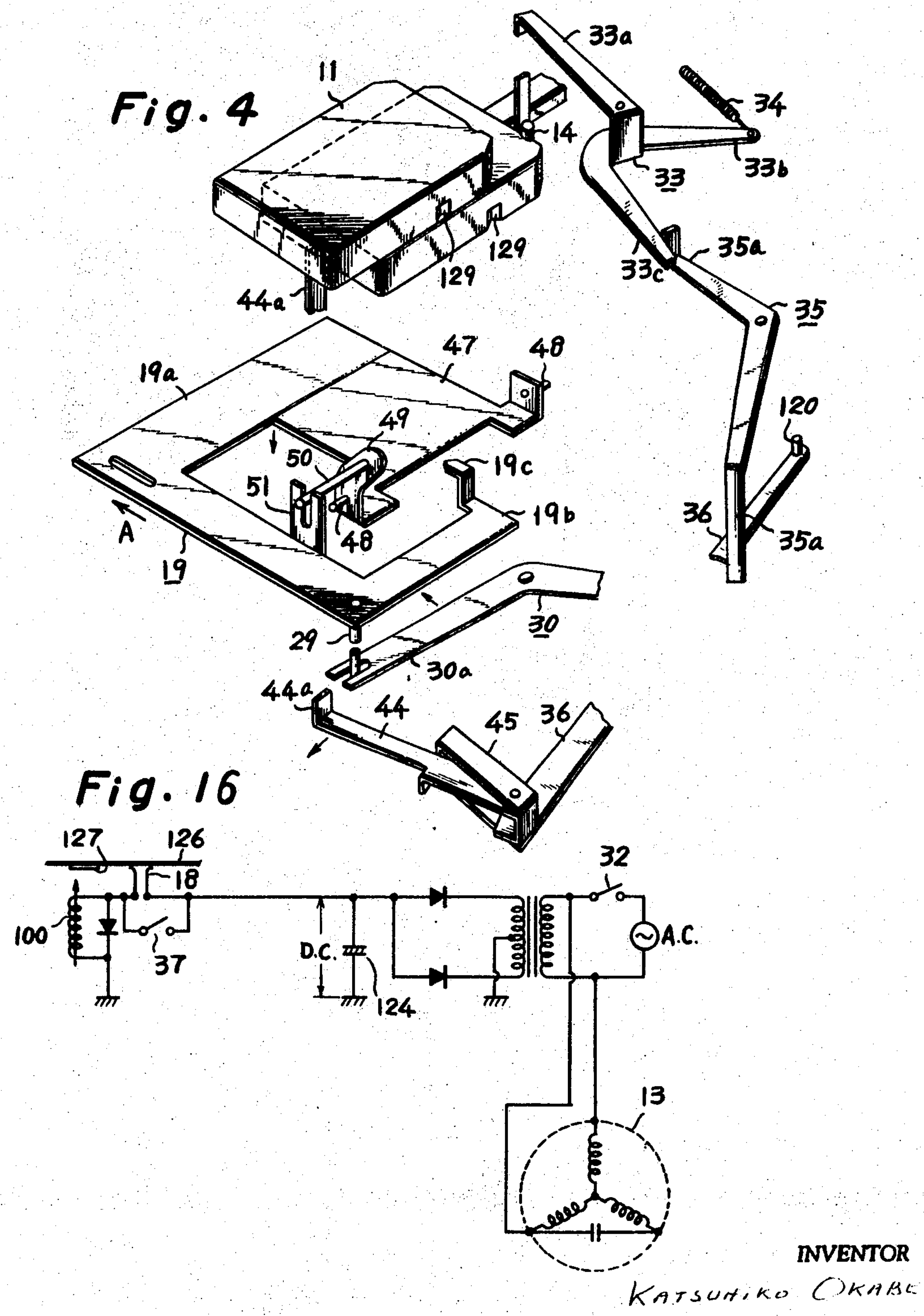
FIG. 4 is an exploded perspective view of a portion of the player showing a relationship of the principal levers.
FIG. 16 is a circuit diagram showing an embodiment of an electric circuit according to this invention.

When a plurality of cartridges 11 are loaded in a stack of layers in the casing 12 the microswitch 32 is closed by a switch lever 31. By closing of the microswitch 32 the motor 13 is made to be connected to an AC power source as shown in FIG. 16 and starts it revolving. Before a cartridge starts playing, the lever 33 is moved by the spring 34 to a position as indicated in FIG. 1 so that the lever 35 is in the position shown and the microswitch 37 is closed. Accordingly, by closing of the microswitch 37 a solenoid 100 shown in FIG. 7 to FIG. 11 is supplied a DC current through the switch 37 and starts operation.

Figures 7, 8, 9:
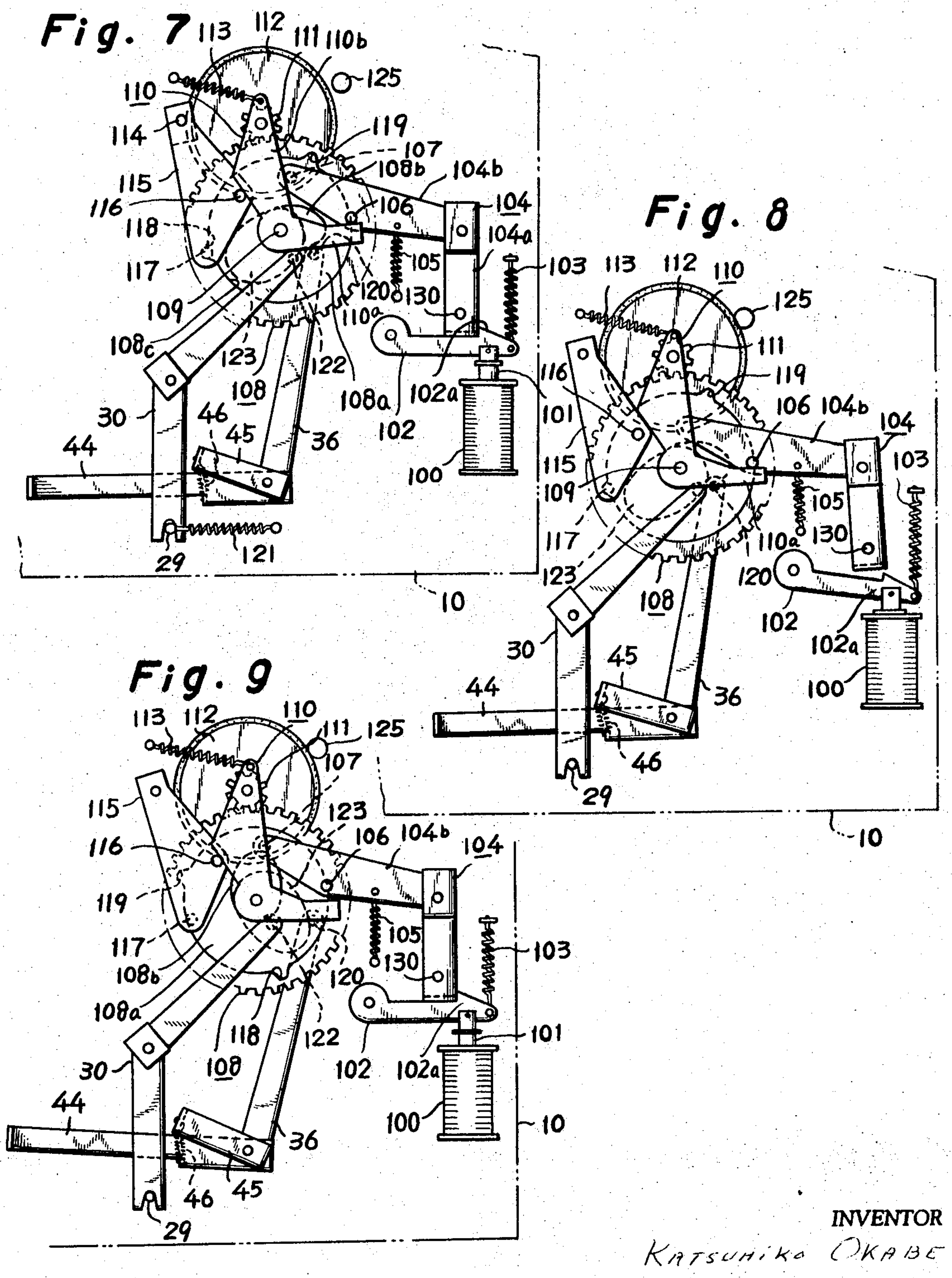
FIG. 7 through FIG. 11 are plan views respectively showing successive stages of operation of the principal parts of a change cycle mechanism.
Figures 10, 11:
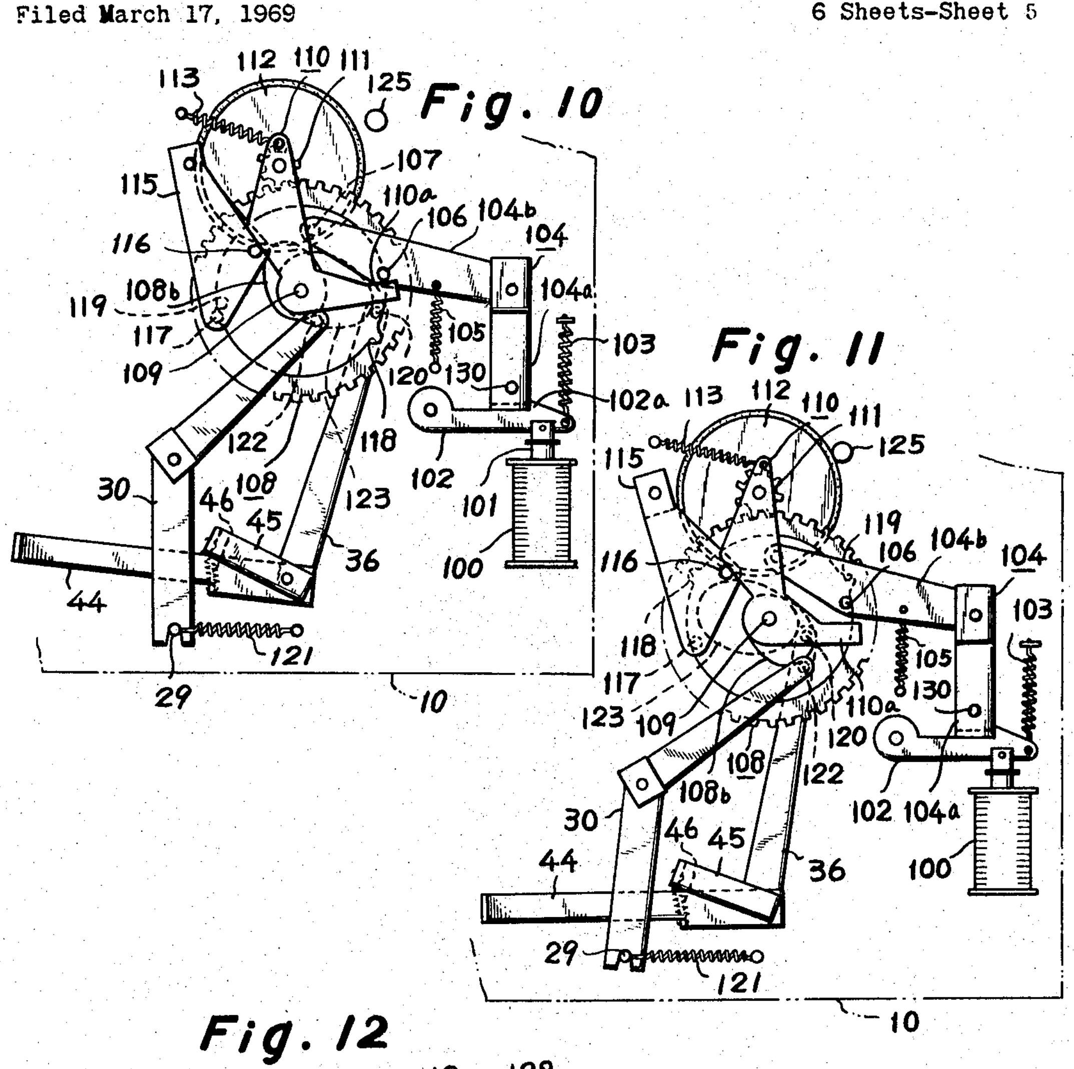
Figure 12:
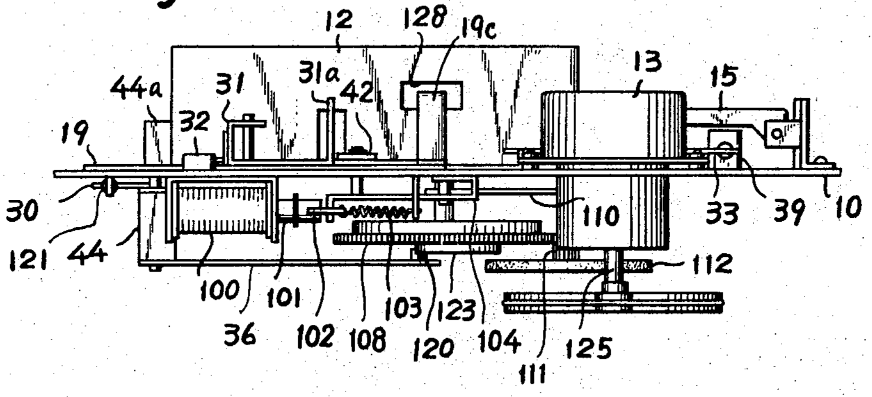
FIG. 12 and FIG. 13 are respectively a side view and a front view of the player shown in FIG. 1.
Figure 13:
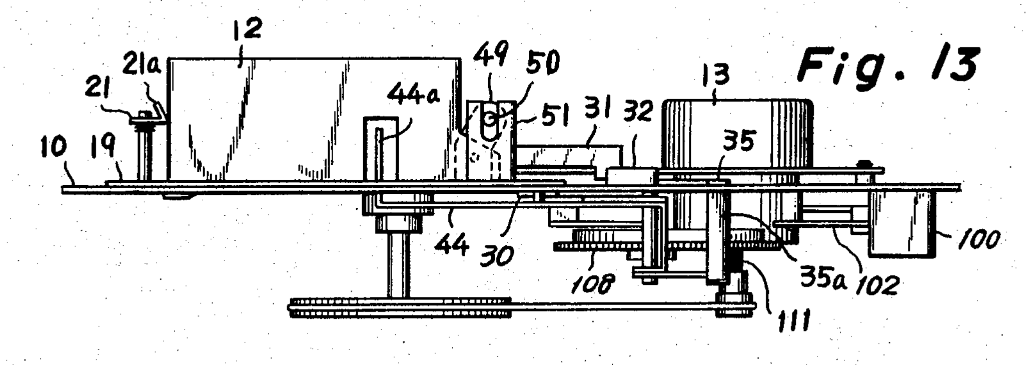
Figure 14A:
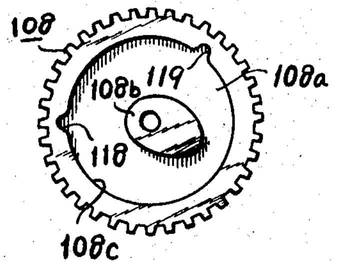
FIGS. 14A through 14C are respectively a plan view, a vertically sectional side view, and a bottom view of a cam gear.
Figure 14B:
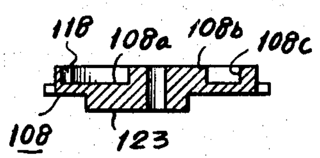
Figure 14C:
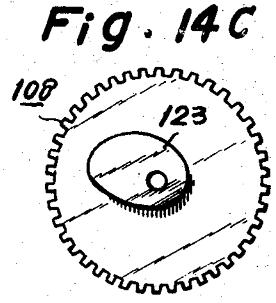

FIG. 7 to FIG. 11 show the principal parts of the change cycle mechanism in which the chassis 10 has been removed for clarity. FIGS. 12 and 13 are respectively side and front views showing the principal parts of the player of FIG. 1 including a change cycle mechanism. FIG. 7 shows the state of the parts before the plunger 100 operates. An engaging lever 102 in association with an operating lever 101 of the solenoid 100 is moved by a spring 103 and stays in the position shown in FIG. 7. A rotary lever 104 is pulled by a spring 105, one lever arm **104*a* of which engages with an engaging portion 102*a* of the lever 102, while the other lever arm 104*b* has a stud 106 on its upper surface intermediate its ends and a stud 107 on its lower surface at its free end. A lever 110 pivoted on a shaft 109 and having mounted thereon a rotatable cam gear 108 has a lever arm 110*a* in engagement with stud 106. The other lever arm 110*b* of lever 110 has mounted thereon a rotatable idler 112 having secured thereto a small gear 111 meshing with the cam gear 108, and is biased in the counterclockwise direction by a spring 113. A lever 115 pivoted on a shaft 114 has a stud 116 on its upper surface engaging with the lever 110 and a stud 117 on its lower surface. The cam gear 108 has, as shown in FIG. 14, a groove 108*a* which partitions an inner eccentric cam surface 108*b* from an outer circular cam surface 108*c*. On the circular cam surface 108*c* are provided recesses 118, 119 for engaging with the stud 117. The lever 36 can swing along the inner eccentric cam surface 108*b* while the stud 120 at the forward end of the lever 36 is in contact with the outer circular cam surface 108*b*. The lever 30 is tensioned by a spring 121 and engages the surface of an eccentric cam 123, while a stud 122 is in contact with the surface of the eccentric cam 123 on the lower surface of the cam gear 108**.

Thus, by loading a cartridge 11 in the casing 12, the solenoid 100 operates for a short period of time while the condenser 124 (FIG. 16) is discharged, and pulls the operating lever 101 whereby the lever 102 moves to rotate in the clockwise direction. As shown in FIG. 8, the lever 102 releases the lever 104 from engagement with the engaging portion **102*a*. After being released the lever 104 swings in the counterclockwise direction by tension of the spring 105. By rotation of the lever 104 the lever arm 110*a* rotates in the clockwise direction around the shaft 109 by the stud 106 on the lever arm 104*b*. The lever arm 110*b* swings in the state that the small gear 111 gears with the cam gear 108 and the idler 112 is pressed in contact with a motor shaft 125. Further, by rotation of the lever 110 the lever arm 110*b* is released from engagement with the stud 116 so that the lever 115** becomes free for rotation.

At the above described position in FIG. 8, the idler 112 is imparted a force of rotation by the rotating motor shaft 125 and the cam gear 108 geared with the small gear 111 starts rotation in the counterclockwise direction. By rotation of the cam gear 108 the stud 117 is disengaged from the recess 118 and is sliding along the cam surface **108*c*. In the rotation of the cam gear 108, the lever 104 having the stud 107 in contact with the cam surface 108*b* turns in the clockwise direction following the contour of the cam surface. As shown in FIG. 9 the lever arm 104*a* is again engaged with an engaging portion 102*a* of the lever 102 which has returned to its original position by the spring 103 after the solenoid 100 has operated for a short period of time. At the same time the lever 36, having the stud 120 which contacts with the cam surface of the cam 123, turns in the clockwise direction corresponding to the contour of the cam surface. Thus, by rotation of the lever 36, the lever arm 44*a* of the lever 44 pushes the rear portion of the cartridge 11 at the lowermost stage or layer to a forward position so that a tape within the cartridge contacts with the capstan 14, the head 16, and the sensor 18 to start playing. Therefore, when the cam gear 108 starts rotation and the stud 117 shown in FIG. 10 engages with a subsequent recess 119**, the cartridge is then in a reproducing and playing state.

In this operation, the lever 33 is pushed forward by the front surface of the tape cartridge 11 which has been pushed and swings in the clockwise direction. The lever 35 engaging with the lever 36 in rotation turns in the counterclockwise direction and thereby the microswitch 37 is opened. When the stud 117 engages with the recess 119, the lever 115 slightly turns and the lever 110 is urged to turn by spring 113. And the idler 112 is released from the motor shaft 125 and the cam gear 108 stops its rotation.

Figures 15A, 15B, 15C:
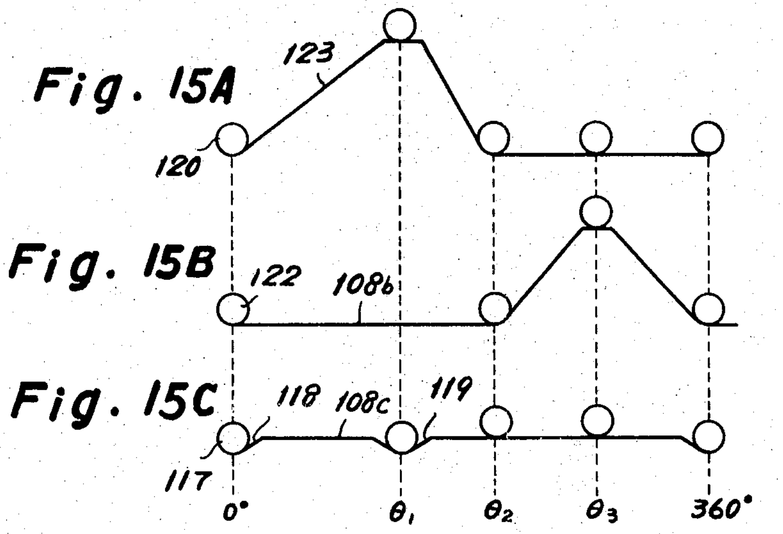
FIGS. 15A through 15C are respectively developed views of a cam surface illustrating the operation of the cam mechanism.

FIG. 15A through FIG. 15C are exploded diagrams of the cam surfaces. FIG. 15A shows the relation of the cam 123 and the stud 120, FIG. 15B of the cam surface **108*b* and the stud 122, FIG. 15C of the cam surface 108*c*, recesses 118, 119 and the stud 117 respectively. As described above, when the stud 117 is disengaged from the recess 118 and the cam gear 108 turns in an angle $\theta_1$ for engagement with the recess 119, the stud 120 reaches the top of the cam 123 and the lever 44 is in a position of being fully turned, while the stud 122** is not turned.

With the progress of playing of the cartridge 11, an electroconductive sensing tape 127 at a position of termination of playing on the tape 126 runs into contact with the sensor 18, the sensor 18 is electrically closed and the solenoid 100 starts its operation again for a short period of time. By starting of operation of the solenoid 100 the cam gear 108 again starts rotation and the stud 117 is disengaged from the recess 119. During rotation of the cam gear 108 in an angle $\theta_2$ the stud 120 moves along the cam 123 and the levers 36, 44 turn in the counterclockwise direction. The lever 33 which has been released from engagement by the levers 36, 35 moves in the counterclockwise direction by the spring 34, pushing the cartridge again into the casing 12 by pushing arm **33*a***.

Figures 5, 6:
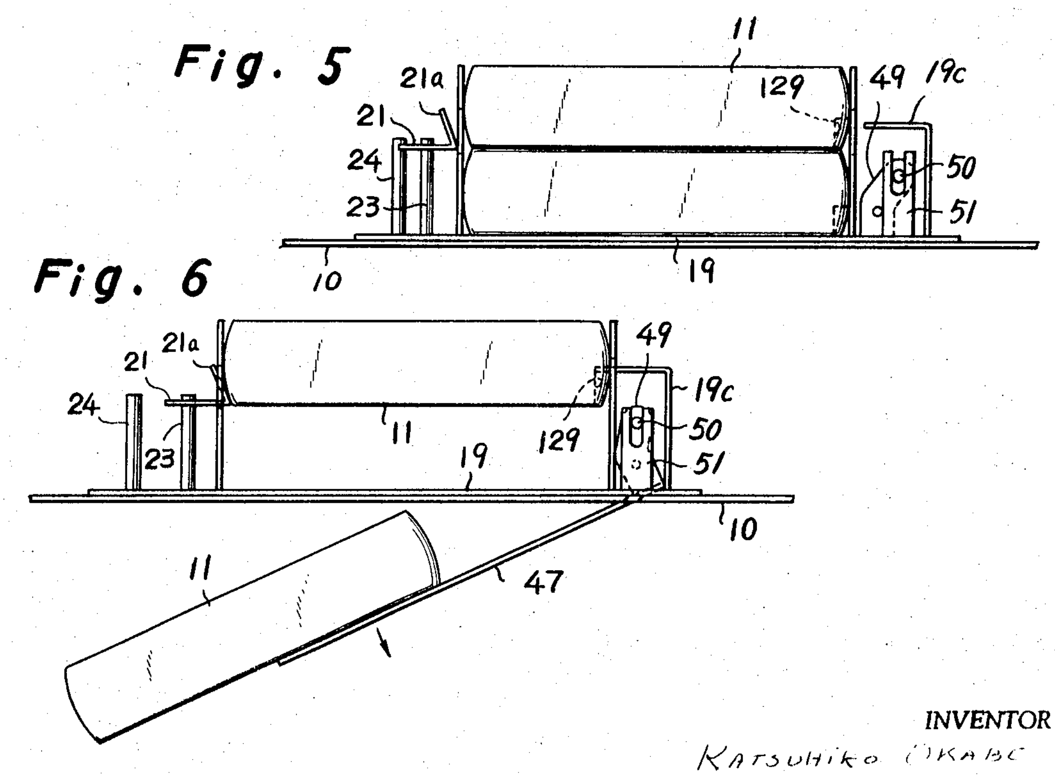
FIG. 5 and FIG. 6 are diagrammatic front views of principal parts respectively illustrating the excluding and dropping operations of a tape cartridge.

While the cam gear 108 turns in an angle $\theta_3$ as shown in FIG. 15, the levers 36, 44 stay in the same position and the stud 122 moves along the cam surface **108*b* and the lever 30 turns in the clockwise direction fully in an angle $\theta_3$. By said rotation of the lever 30 the slide lever 19 is slidingly moved through the pin 29 in the direction indicated by an arrow A. Upon the lever 19 being moved in sliding the bent portion 19*c* advances into the casing 12 from an opening 128 on the side wall 12*c* of the casing 12. As shown in FIG. 6 said portion 19*c* engages with a recess 129 on the cartridge 11 and supports one side thereof. On the other hand, the bent portions 20*a*, 21*a* of the levers 20, 21 released from engagement with the pin 24 are pushed into the casing 12 by force of springs 27, 28, and support the other side of the cartridge 11. Said bent portion 19*c* and levers 20, 21 are provided so as to support a cartridge in the second stage from bottom. While the lever 19 slides, the crooked arm 49 turns counterclockwise about the pivot 48 through the pin 50 engaging with the portion 51, and the bottom plate 47 turns downward as shown in FIG. 6 and the cartridge 11 in the lowermost stage slides from the bottom plate 47 and falls by its own weight to be discharged. When the cartridge in the lowermost stage is so discharged, the switch 32 is opened. As the lever 19 slides, the lever 104 turns clockwise by the lever 42 which engages with stud 130 secured to the lever 104 and again engages with the portion 102*a* of the lever 102**.

As the cam gear 108 further turns beyond the angle $\theta_3$ to the angle position of 360° corresponding to one cycle of rotation while the lever 30 turns counterclockwise, the lever 19 slides in the opposite direction from arrow A and the bottom plate 47 turns upward and closes. Simultaneously the bent portions 19*c* and 20*a*, 21*a* retract from the cartridge 11 and let the cartridge which has supported by said portions fall onto the bottom plate 47 being closed. When the cartridge 11 drops on the bottom plate the microswitch 32 again is closed. And then the solenoid 100 operates and the change cycle mechanism repeats its change cycle operation as above described from the state shown in FIG. 7. After the cartridges are all played and dropped for release, the switch 32 remains open and the power source is automatically interrupted.

It is to be noted that in the above described embodiment the cartridge after being played is discharged by opening of the bottom plate, but it may also be released by any other way for example by sliding in a horizontal direction.

The invention is not restricted only to the above described embodiment but it may anyway be modified without departing from the spirit and scope of the invention.

What I claim is:

1. An automatic tape cartridge player comprising a casing housing a plurality of tape cartridges in a vertical stack and including a bottom plate, said bottom plate being mounted for selective pivotal movement between a first, substantially horizontal position wherein it defines a bottom support for the lowermost cartridge of the stack of cartridges and a second, downwardly inclined position wherein said lowermost cartridge is free to slide downwardly and outwardly of the player under its own weight, said bottom plate normally being retained in said first position; playing means adjacent to said casing for playing successive tape cartridges; means for slidably moving said lowermost cartridge from an original position at the bottom of the stack to a playing position in juxtaposition to said playing means; means for slidably moving said lowermost cartridge from the playing position back to said original position following playing of said lowermost cartridge; means for engaging and supporting the next higher cartridge immediately above said lowermost cartridge when said lowermost cartridge has been returned to said original position; and pivoting means for pivoting said bottom plate downwardly to said second position following engagement of said engaging and supporting means with said next higher cartridge whereby said lowermost cartridge will be ejected downwardly and outwardly under its own weight, and for thereafter pivoting said bottom plate upwardly to said second position, said pivoting means being interconnected with said supporting and engaging means to disengage said engaging and supporting means from said next higher cartridge following return of said bottom plate to said second position, whereby said next higher cartridge will be released to drop onto said bottom plate.

2. A tape cartridge player comprising a casing housing a plurality of tape cartridges in a vertical stack and having a bottom plate, said bottom plate being mounted for selective pivotal movement between a first, substantially horizontal position wherein it defines a bottom support for the lowermost cartridge of the stack of cartridges and a second, downwardly inclined position wherein said lowermost cartridge is free to slide downwardly and outwardly of the player under its own weight; means for slidably moving said lowermost tape cartridge from an original position at the bottom of the stack to a playing position in juxtaposition with a playing head in response to positioning of said lowermost cartridge on said bottom plate; a generally U-shaped side lever having a pair of opposed arms on the opposite ends thereof and a projection portion; a first pin fixed on one of said opposing arms; at least one fixed shaft; at least one supporting lever pivotally mounted on said fixed shaft and engaging with said first pin at one end thereof; said bottom plate having a second pin engaged with said projection portion of said slide lever and being swingable about a horizontal pivot by movement of said slide lever in a direction transverse to said horizontal pivot; means for slidably moving said lowermost tape cartridge from said playing position to said original position following playing of the tape cartridge; means for moving said slide lever horizontally in a direction transverse to said horizontal pivot in one reciprocal motion to engage the opposite end of said supporting lever and the other of said opposing arms of said sliding lever with the next higher tape cartridge immediately above said lowermost cartridge to thereby engage and support said next higher cartridge, to pivot said bottom plate downwardly to said second position to thereby discharge said lowermost cartridge under its own gravity and to thereafter return said bottom plate to said first position, and thereafter to release said supporting lever and said other of said opposed arms from said next higher tape cartridge to thereby drop the stack of cartridges onto said bottom plate.

3. An automatic tape cartridge player as defined in claim 2, further comprising means for connecting the player to a power supply responsive to positioning said lowermost tape cartridge on said bottom plate, and for disconnecting the player from said power supply responsive to the ejecting of said lowermost cartridge from said bottom plate.

4. An automatic tape cartridge player as defined in claim 3, further comprising a rotatable cam disk having a plurality of coaxially disposed cam surfaces, said cam surfaces respectively controlling said means for slidably moving said lowermost cartridge from said original position to said playing position, said means for slidably moving said lowermost tape cartridge from playing position back to said original position, and said means for moving said slide lever.

References Cited

UNITED STATES PATENTS

| | | | |
|---|---|---|---|
| 3,197,150 | 7/1965 | Camras | 274—4(F)X |
| 3,289,962 | 12/1966 | Gellenthin | 274—4(F)X |
| 3,353,443 | 11/1967 | Hall | 274—4(F)X |
| 3,477,726 | 11/1969 | Laschenski | 274—4(F) |
| 3,504,916 | 4/1970 | Ban | 274—4(F) |
| 3,359,665 | 12/1965 | Gerry | 274—4(F)X |

OTHER REFERENCES

Hanson, North American Philips Comany, Inc., Audio Engineering Society Preprint No. 584, available for sale to public, Apr. 30, 1968.

LEONARD FORMAN, Primary Examiner

D. A. DEARING, Assistant Examiner

U.S. Cl. X.R.

179—100.2Z